United States Patent [19]
Leffel et al.

[11] Patent Number: 5,288,355
[45] Date of Patent: Feb. 22, 1994

[54] STRUCTURAL AIRFOIL HAVING INTEGRAL EXPULSIVE SYSTEM

[75] Inventors: Kevin L. Leffel, Akron; James C. Putt, Doylestown; Richard L. Rauckhorst, North Canton, all of Ohio

[73] Assignee: The B.F. Goodrich Company, Akron, Ohio

[21] Appl. No.: 793,906

[22] Filed: Nov. 18, 1991

Related U.S. Application Data

[62] Division of Ser. No. 432,715, Nov. 6, 1989, Pat. No. 5,098,037.

[51] Int. Cl.$^5$ ............ B64D 15/00; B29C 41/02
[52] U.S. Cl. ............ 156/156; 156/242; 156/245; 156/250; 156/252; 244/134 R; 244/134 A; 244/134 D
[58] Field of Search .......... 156/155, 242, 245, 250, 156/252; 244/134 R, 134 A, 134 D

[56] References Cited
U.S. PATENT DOCUMENTS

| | | | |
|---|---|---|---|
| 3,549,964 | 12/1976 | Levin et al. | 317/262 |
| 4,004,388 | 1/1977 | Stefanik | 52/398 |
| 4,099,691 | 7/1978 | Swanson et al. | 244/207 |
| 4,678,144 | 7/1987 | Guehner et al. | 244/134 R |
| 4,690,353 | 9/1987 | Haslin et al. | 244/134 D |
| 4,706,911 | 11/1987 | Briscoe et al. | 244/134 A |
| 4,747,575 | 5/1988 | Putt et al. | 251/30.02 |
| 4,826,108 | 5/1989 | Briscoe et al. | 244/134 |
| 4,836,474 | 6/1989 | Briscoe et al. | 244/134 |
| 4,875,644 | 10/1989 | Adams et al. | 244/134 |
| 4,878,647 | 11/1989 | Putt et al. | 251/30.05 |

FOREIGN PATENT DOCUMENTS 1161014  1/1984  Canada .

*Primary Examiner*—Caleb Weston
*Attorney, Agent, or Firm*—David M. Ronyak; Kevin L. Leffel

[57] ABSTRACT

A structural member having integral surface de-icing capability and method of manufacture are described. The structural member includes a non-metallic high tensile modulus fiber-reinforced matrix structural backing, thin force and displacement generation means, and a thin high tensile modulus outer skin bonded to said backing and said force and displacement generation means which is postioned between the backing and the skin. The force and displacement generation means may include one or more inflatable tubular members and/or electromagnetic apparatus. The structural member may be substituted for the aluminum alloy leading edge structural skin typically employed on modern aircraft.

15 Claims, 2 Drawing Sheets

FIG. 4
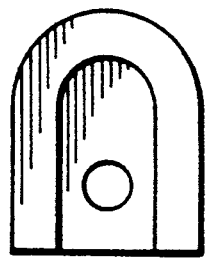
FIG. 5
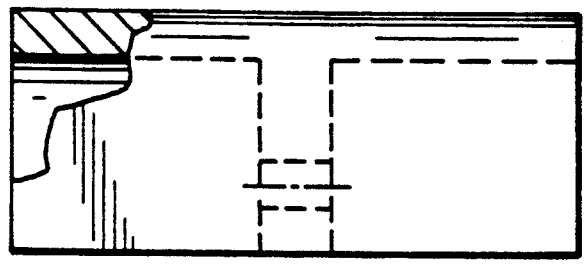
FIG. 6
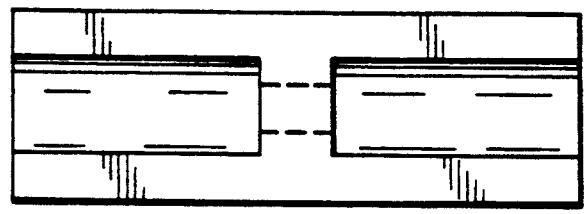
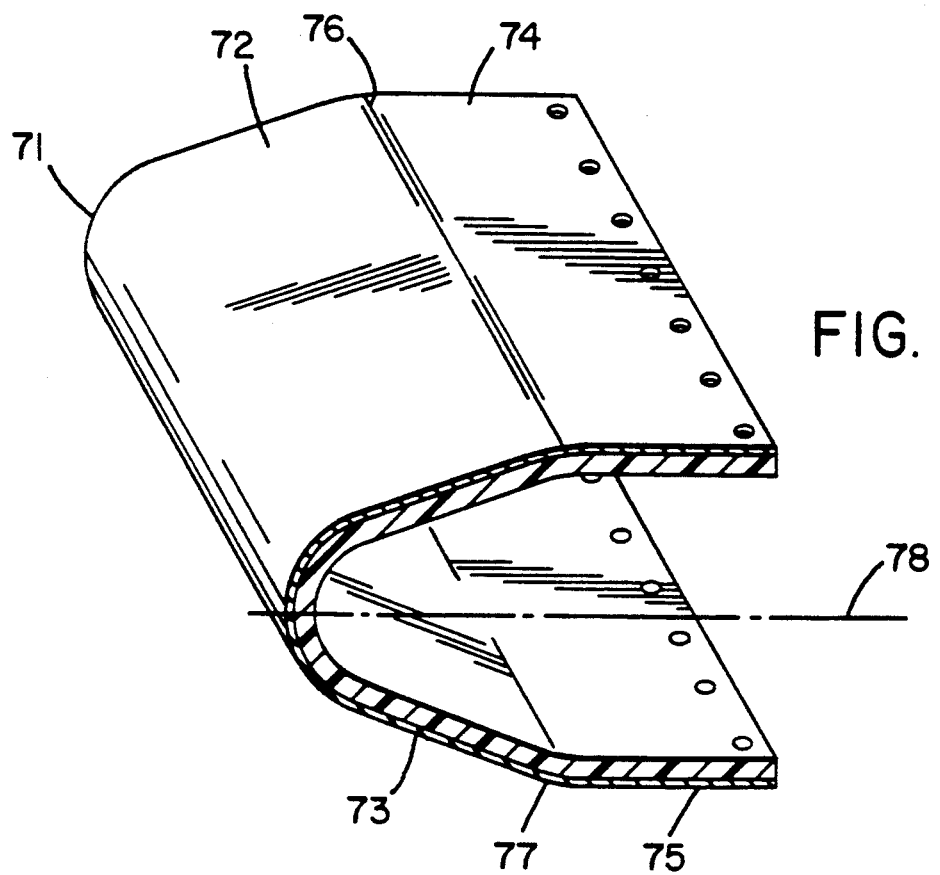
FIG. 7

STRUCTURAL AIRFOIL HAVING INTEGRAL EXPULSIVE SYSTEM

This application is a division of my copending application for Structural Airfoil Having Integral Expulsive System, U.S. patent application Ser. No. 07/432,715, filed on Nov. 6, 1989, now U.S. Pat. No. 5,098,037.

FIELD OF THE INVENTION

This invention relates to a composite structural member including as an integrated feature a system for separating a solid body such as a layer of ice from the outer surface of the structural member. More particularly, this invention relates to a structural member particularly suitable as an airfoil or leading edge which includes as an integral feature, a force and displacement generation means suitable for deicing of the outer high modulus skin of the composite structural member when employed in aircraft leading edge surfaces.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing, known as thermal de-icing, leading edges are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal de-icing, an electrical heating element is placed in the leading edge zone of the aircraft component, either by inclusion in a elastomeric boot applied over the leading edge, or by incorporation into the skin structure of the aircraft component This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile the de-icer as well as in the leading edge to thereby crack ice accumulating on the leading edge. These conventional pneumatic de-icers require a large volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 kPa. The modulus of elasticity of ice is variously reported as being between about 275,000 kPa and about 3,450,000 kPa. Ice is known to be possessed of an elastic modulus enabling typical ice accumulations to adjust to minor changes in contours of surfaces supporting such ice accumulations. The modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

Other mechanical means for effecting ice de-icing include electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

Another electromechanical ice removal system is described in U.S. Pat. No. 4,875,644 to Adams et.al., the teachings of which are herein incorporated by reference. Two or more sheet-like arrays, each containing in spaced apart relationship a plurality of parallel ribbon-shaped electrical conductive members, are rapidly and forcefully driven apart when a large magnitude current pulse is fed to the conductors.

U.S. Pat. Nos. 4,706,911 to Briscoe et al and 4,747,575 to Putt et al disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.1 second and preferably not more than about 0.5 milliseconds. FIG. 4 and the attendant description of U.S. Pat. No. 4,706,911 describe an ejector/pilot operated discharge valve suitable for use in such pneumatic impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse de-icing systems have led to continuing efforts to improve valves for delivery of the desired fluid impulse.

While the devices and methods disclosed in the foregoing patents have been found to be suitable for deicing of aircraft, it remains a desired goal of the industry to reduce weight and increase service life and reliability wherever possible. Toward these objectives modern aircraft designers and manufacturers are specifying with increasing frequency use of lightweight composite materials manufactured from high modulus fibers including, but not limited to, carbon, graphite, aramid, and glass in matrices of organic resins or carbon. Leading edge surfaces such as those found on wings and struts of aircraft and tail sections have been provided with separately manufactured apparatus such as that disclosed in U.S. Pat. Nos. 4,706,911 and 4,747,575. Such apparatus have been fitted to existing wing structures by adhesive bonding of such auxiliary deicing apparatus. Such auxiliary devices change the contour of the leading edge by virtue of their presence, an undesired consequence. As an alternative, at the time of design or prior to fitting of such an apparatus, the leading edge of the airfoil of certain prior art embodiments has been modified so as to provide a recess for fitment of the deicing apparatus. This latter manner of providing deicing apparatus resulted in a finished assembly having smooth airflow characteristics due to the provision of such recess. However, in this instance, the underlying support surface and airfoil has been structurally complete without addition of the deicing apparatus. The deicing apparatus provided no additional or minimal additional structural reinforcement to the underlying support surface to which it was affixed. Many of the heretofore known accessory deicing apparatuses were provided with an outer ice accreting surface formed of elastomeric material such as rubber (neoprene) or urethane. These materials are far more susceptible to erosion from the action of rain, sleet, hail, and snow during flight than the conventional aluminum alloy leading edge surface employed on modern large commercial and certain general aviation and commuter aircraft. Such aircraft have a service life expectancy of twenty or more years, including the aluminum alloy skin which is typically from about 0.025 inch to about 0.190 inch thick. It is an objective of the aircraft industry to minimize repair or replacement of such deicing apparatus. Ideally, it is desired that the deicing apparatus include an ice accreting surface having a resistance to rain erosion at least equal to that of the aluminum alloy skin currently employed on large turbine powered commercial aircraft which are deiced using bleed air systems.

Rain is not the only type of impact that leading edges encounter. Impacts by birds, hail, and debris kicked up from the runway and accidents during routine aircraft maintenance are also likely during the operational life of the aircraft.

SUMMARY OF THE INVENTION

According to an aspect of the present invention, there is provided a structural member having integral surface de-icing capability comprising:
(a) a non-metallic high tensile modulus fiber reinforced matrix structural composite substructure;
(b) thin force and displacement generation means;
(c) a thin high tensile modulus outer skin bonded to said substructure and said force and displacement generation means, said force and displacement generation means being positioned between said substructure and said skin.

According to another aspect of the invention, there is provided a method of making a unitary structural member having integral surface de-icing capability, the method comprising the steps of:
(a) providing a female mold,
(b) inserting an outer thin high tensile modulus skin having an inner side and an opposing outer side and an outer bonding layer into the mold with the outer side of the skin nearest the mold,
(c) forming thin force and displacement generation means having an inner side and an opposing outer side and applying the outer side of the thin force and displacement generation means to the outer bonding layer,
(d) forming a composite substructure of a plurality of layers of reinforcing filaments in a polymeric matrix and applying said substructure to the inner side of the force and displacement generation means, and,
(e) bonding the combined outer skin, force and displacement generation means, and substructure together to provide said unitary structural member.

The features and advantages of the present invention will become more apparent when viewed in light of the description of the best embodiment to the invention and drawings which follow, which together form a part of the specification.

BRIEF DESCRIPTION OF THE DRAWINGS

FIGS. 4, 5 and 6 respectively are a side elevation view, front elevation view partially broken away, and a bottom view of a rain erosion test sample holder.

FIG. 7 is an isometric view of another test sample configuration used in testing rain erosion resistance.

DETAILED DESCRIPTION OF THE INVENTION

Figure 1:
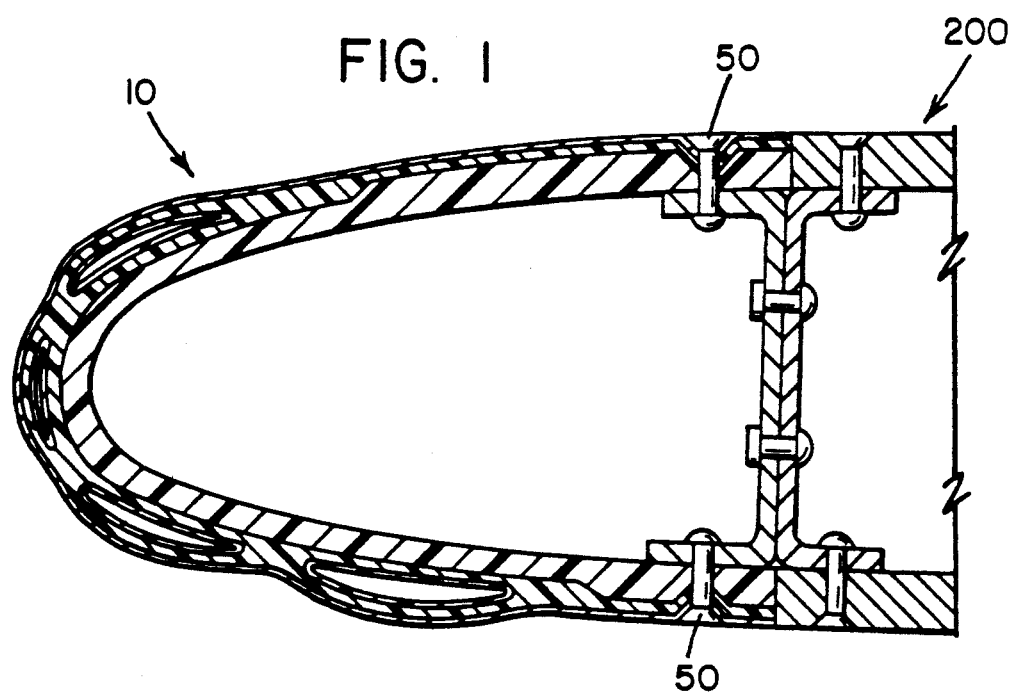
FIG. 1 is a fragmentary sectional view of an airfoil having an apparatus according to the present invention defining the leading edge portion thereof, depicted in the energized state.

The present invention provides an apparatus in the form of a structural member having integral surface separation capability which is capable of deicing a leading edge. The present invention also provides a method of manufacture of such apparatus and a method for deicing employing such apparatus. Deicing is removal of ice subsequent to its formation upon a leading edge. A "leading edge" is that portion of a surface of a structure which functions to meet and break an airstream impinging upon the surface of the structure. Examples of leading edges are respective forward portions of wings, stabilizers, struts, nacelles, and other housings and protrusions first impacted by an airstream passing over an aircraft while in flight. Referring to the drawings, FIG. 1 depicts a leading edge structure 10 in accordance with the invention having integral deicing capability. Apparatus 10 is shown in its energized condition with distortion exaggerated for purpose of illustration. In reality, the amount of distortion from the smooth continuous contour of the airfoil is much less. Apparatus 10 is employed in substitution for the heavy aluminum alloy skin (not illustrated) traditionally employed as the leading edge surface of an airfoil. Such aluminum alloy skins typically range in thickness from as low as about 0.025 inches to as high as 0.190 inches, the latter being for a 100-passenger or more capacity commercial airliner. Apparatus 10 is secured in position to the remainder of the airfoil structure 200 in conventional manner, i.e., by flush fitting mechanical fasteners 50 as shown in FIG. 1 or by adhesive bonding. Such construction enables field replacement of the apparatus 10 as required, for example, due to impact damage.

Figure 2:
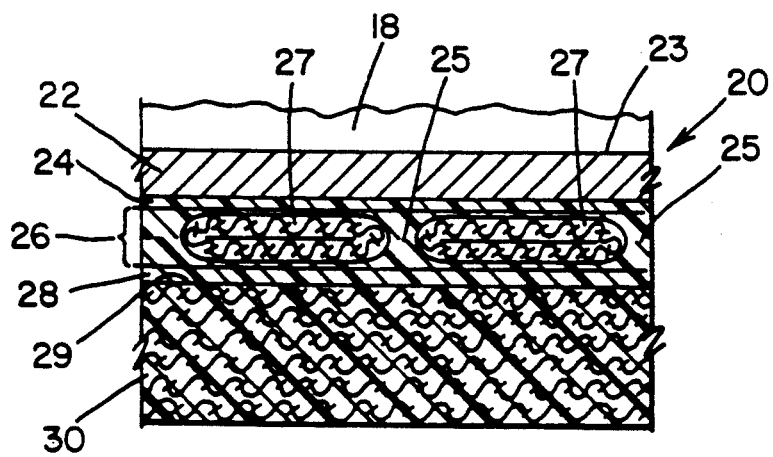
FIG. 2 is an enlarged fragmentary sectional view of an apparatus similar to that shown in FIG. 1 in its unenergized state with a layer of ice thereon.

Referring now to FIG. 2, there is shown a deicing apparatus 20 according to a preferred embodiment of the present invention. Apparatus 20 includes a surface ply or outer skin 22 of a material having a modulus of elasticity of at least 40,000 kPa. Immediately underlying the surface or outer skin 22 is an outer or skin bonding ply 24 of polymeric material. Immediately underlying the skin bonding ply 24 is an expulsive force and displacement generation means 26. Immediately underlying the expulsive force and displacement generation means 26 is an inner bonding ply 28 of polymeric material. Underlying the inner bonding ply 28 is a fiber reinforced composite substructure 30. A layer of ice 18 is shown adhered to the outer surface 23 of outer skin 22.

The outer skin 22 may be formed from metal or plastic. Particularly preferred is an outer skin 22 formed of titanium alloy. Thickness of the outer skin 22 typically will range for metals from about 0.002 to about 0.030 inch and for plastics will range from about 0.005 to about 0.080 inch. Other suitable metals may include stainless steels and aluminum alloys. Particularly preferred plastic material for the skin is polyetheretherketone (PEEK) available from Imperial Chemical Industries PLC. Where longest service life is required, metals are strongly preferred.

Bonding plies 24 and 28 are formed of polymeric material suitable for bonding to the layers on either side. Such compounds are well known in the art and the selection of a particular compound will be predicated upon a number of factors which include operating environment, the nature of the outer ice accreting skin 22 and the underlying force and displacement generation means 26 for the outer bonding ply 24, and for the inner bonding ply 28 the materials used in the force and displacement generation means 26 and the adjacent contiguous layer 29 of the underlying composite substructure 30. Where the outer skin 22 is formed of titanium alloy and the force and displacement generation means 26 comprises an inflatable tubular members 27, the outer bonding ply 24 is preferably formed of nitrile phenolic resin in the form of a film such as film adhesive AF32 available from 3M Company. The inner bonding ply 28 in certain preferred embodiments is also formed from such 10 mil thick nitrile phenolic film adhesive. The regions 25 between adjacent tubes 27 are also formed of the same nitrile phenolic materials. The same 3M product AF32 may be employed for both the outer bonding ply 24 and the inner bonding ply 28 provided it is compatible with the materials of the layers which it is to join. An eminently suitable alternate material for the inner and outer bonding plies 24, 28 and regions 25 is a flexibilized epoxy film such as code EA951 available from Hysol Aerospace Products, Pittsburg, Calif.

Layers 24 and 28 and the material in regions 25 are shown to be distinct to facilitate illustration and explanation of the invention. In practice distinct layers are commonly not recognizable and the material in regions 25 may have come from coating of tube materials or layers 24, 28.

Force and displacement generation means 26 is thin and typically has a thickness not exceeding 0.100 inch. Each inflatable member 27 is a tube-like structure typically running the length of the deicer, i.e., in the spanwise direction of the apparatus and airfoil. Each inflatable member 27 is formed from polymer coated textile fabric. The fabric may be coated on one side only and formed into a tubular member with the coating facing to the outside of the tube or with the coating facing to the inside of the tube provided an adhesion barrier is placed in the inside of the tube during manufacture to prevent adhesive joining of the fabric layers, thereby preventing formation of an inflatable tubular member. Polytetrafluoroethylene (PTFE) film is well suited for use as an adhesive barrier in this application. Each inflatable tubular member 27 serves as a fluid impulse tube. The inflatable tubular members within the apparatus are joined by conduit means (not illustrated) to the remainder of a deicing system (not illustrated) which includes a timer/controller (not illustrated), a high pressure gas supply (not illustrated), and an impulse delivery valve (not illustrated).

A schematic of a suitable control system and high pressure valve for causing fluid impulse inflation of an inflatable tubular member in a structural member according to the invention having integral surface separation capability are described in U.S. Pat. No. 4,706,911, the contents of which are herein incorporated by reference. Preferred embodiments of gas impulse delivery valves are described in U.S. Pat. No. 4,873,647 to Robert M. Hohenshil and James C. Putt, the contents of which are herein incorporated by reference.

The fiber-reinforced polymer composite substructure 30 is formed of a plurality of layers of filamentary material in a matrix of thermoset polymeric material. Such materials and their combination into a laminated composite structure are well-known in the art. Selection of particular materials and a particular construction will be predicated upon a number of factors which may include the nature of the airfoil of which the apparatus is to form a leading edge component, bending stiffness, torsional stiffness, resistance to frontal impact, overall thickness limitation and overall weight limitation. Particularly preferred embodiments of apparatus according to the invention include a substructure 30 formed graphite or carbon fibers reinforcing an epoxy matrix. Other high modulus, high strength fibers, such as aramid and fiberglass and the like may be employed alone or in combinations including these and other fiber types.

Figure 3:
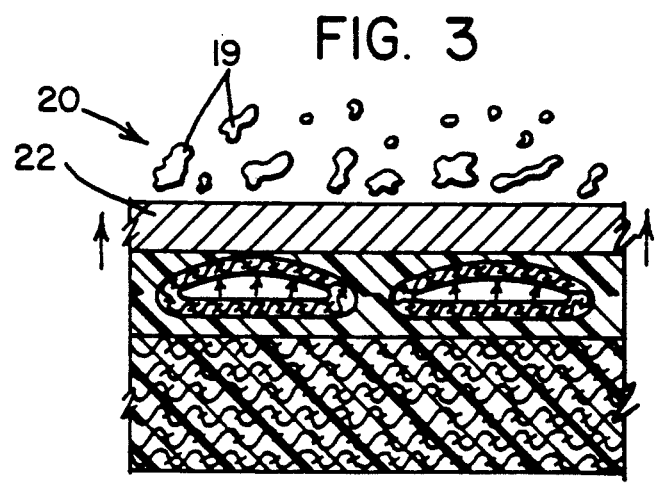
FIG. 3 is an enlarged fragmentary view of the apparatus of FIG. 2 in its energized state.

In FIG. 3 deicing apparatus 20 is shown in its energized condition with ice particles 19 being ejected. Deicing apparatus 20 depicted in FIG. 3 is of the same construction as shown and described in regard to FIG. 2. FIG. 2 depicts deicing apparatus 20 in its at-rest or unenergized condition with a layer of ice 18 thereon. In operation, high pressure gas, typically air, is introduced in the form of a pulse into inflatable tubular members 27. Such fluid introduction produces a rapid but momentary distortion in the outer skin 22 as the pulse travels along the tube. Operation of the apparatus 20 of the present invention is generally as described in U.S. Pat. Nos. 4,706,911 and 4,747,575, and if additional inflatable tubes (not illustrated in the present application) which branch off the principal inflation tubes are provided, as described in U.S. Pat. No. 4,826,108. These gas pulses produce near instantaneous pressure changes within the inflatable tubular members 27 thereby producing a series of near instantaneous distortions to the ice accreting surface 21 overlying the deicer tube 27 which cause ice layer 18 to be broken into particles 19 and ejected. Typical supply air pressure to a rapid acting valve whose output is introduced into inflatable tubular members 27 is at least about 1000 psig (6894 kPa), more preferably 1500 psig (10340 kPa), and may be in excess of 2000 psig (13788 kPa).

Applicants have unexpectedly discovered that unitary integrated deicing apparatus including use of a composite substructure in a metal skinned, pneumatically-activated deicer provides greatly improved performance as compared to earlier known constructions which are intended to be affixed by bonding or mechanical means to the outer surface of the original skin of an aircraft or other object to be deiced. Heretofore the deicing apparatus was separately manufactured in the form of a pad or boot adapted to be secured to the original structural skin of the airfoil. Such a device has been referred to as a deicing pad or deicing boot. In contrast, in the present invention the apparatus is intended to be substituted for the combined original structural skin and separately manufactured and attached auxiliary deicing apparatus. Applicants have discovered that superior resistance to rain erosion requirements of the aircraft industry is exhibited by the invention. In contrast, apparatus according to the prior art exhibits much lower resistance to rain erosion testing with failure typically being exhibited as rupture of the outer ice accreting metal skin. The performance advantages of the invention are illustrated by the following examples.

Example 1

Sample 1 was constructed as follows:

| Layer | Description |
|---|---|
| ———————— | (.005 Thick Ti alloy Surface) |
| ++++++++++++++++++++ | (Natural Rubber Adhesive) |
| xxxxxxxxxxxxxxxxxxxx | (Natural Rubber) |
| ########## | (Inflatable Tube Force Generator) |
| xxxxxxxxxxxxxxxxxxxx | (Natural Rubber) |
| ////////////////// | (Contact Adhesive) |
| ******************<br>****************<br>****************** | (Aluminum Substructure) |
| Rain Erosion Results- | 1 Hour 30 Minutes. |

The construction of Sample 1 is representative of results obtained from combining existing low pressure pneumatic deicer technology and high pressure pneumatic impulse technology. The best rain erosion performance observed with this construction was 1 hour 30 minutes at which failure of the titanium alloy surface was observed.

Example 2

Sample 2 was constructed as follows:

| Layer | Description |
|---|---|
| ———————— | (.005 Thick Ti alloy) Surface |
| ++++++++++++++++++++ | (Nitrile Phenolic Primer) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| ================== | (Contact Adhesive) |
| ******************<br>****************<br>****************** | (Aluminum Substructure) |
| Rain Erosion Results- | 2 hours. |

Nitrile phenolic primer and nitrile phenolic film adhesive were substituted for the natural rubber matrix utilized in Sample 1 to join the force and displacement generation means to the titanium alloy skin ply. As with Sample 1, contact adhesive was utilized to attach the ice protector to the aluminum substructure. Best observed performance on rain erosion was 2 hours with a small crack being first observed at 1½ hours. By the time 2 hours of testing had accumulated, the crack had propagated resulting in failure of the part.

Example 3

Sample 3 was constructed as follows:

| | |
|---|---|
| ++++++++++++++++++ | ———————— (.005 Thick Ti alloy) Surface |
| | (Nitrile Phenolic Primer) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| ================== | (Air Curing Adhesive) |
| ●●●●●●●●●●●●●●●●●●●● | |
| ●●●●●●●●●●●●●●●●●●●● | (Aluminum Substructure) |
| ●●●●●●●●●●●●●●●●●●●● | |
| Rain Erosion Results- | 2 hours 45 minutes. |

Sample 3 was identical in construction to that of Sample 2, except that the contact adhesive utilized in Sample 2 was replaced with a room temperature air curing adhesive for bonding to the aluminum substructure. When subjected to rain erosion testing, cracks began to appear at the edges of the sample at 2 hours 30 minutes and considerable inside cracking and inside erosion were observed by 3½ hours. The part was deemed unserviceable upon accumulation of about 2 hours 45 minutes testing.

Example 4

Sample 4 was of the following construction:

| | |
|---|---|
| | ———————— (.005 Thick Ti alloy) Surface |
| +++++++++++++++++++ | (Air Curing Primer) |
| ))))))))))))))))))) | (Air Curing Adhesive) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| ================== | (Air Curing Adhesive) |
| ●●●●●●●●●●●●●●●●●●●● | |
| ●●●●●●●●●●●●●●●●●●●● | (Aluminum Substructure) |
| ●●●●●●●●●●●●●●●●●●●● | |
| Rain Erosion Results- | 30 Minutes. |

The titanium surface and aluminum substructure were bonded to their respective contiguous layers with a room temperature air curing adhesive. After only 30 minutes of rain erosion testing, skin failure (fatigue cracking and chunking was observed.

Example 5

Sample 5 was of the following construction:

| | |
|---|---|
| | ———————— (.005 Thick Ti alloy) Surface |
| +++++++++++++++++++ | (Urethane Adhesive) |
| xxxxxxxxxxxxxxxxxxxx | (.015 Urethane Film) |
| ########## | (Inflatable Tube Force Generator) |
| xxxxxxxxxxxxxxxxxxxx | (Nitrile Phenolic Film Adhesive) |
| ●●●●●●●●●●●●●●●●●●●● | |
| ●●●●●●●●●●●●●●●●●●●● | (Aluminum Substructure) |
| ●●●●●●●●●●●●●●●●●●●● | |
| Rain Erosion Results- | 1 Hour 30 Minutes. |

It was noted prior to testing that sample 5 included a small crack at its left lower side. As rain erosion testing time accumulated, this initial defect propagated as a fracture in the titanium skin followed by chunking around the crack. The part was deemed unserviceable after 1 hour 30 minutes testing. Total failure was deemed to have occurred at about 2 hours 30 minutes.

Example 6

Sample 6 was of the following construction:

| | |
|---|---|
| | ———————— (.005 Thick Ti alloy) Surface |
| +++++++++++++++++++ | (Nitrile Phenolic Primer) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| ●●●●●●●●●●●●●●●●●●●● | |
| ●●●●●●●●●●●●●●●●●●●● | (Composite Substructure) |
| ●●●●●●●●●●●●●●●●●●●● | |
| Rain Erosion Results- | 7 Hours Without failure. |

In each of the examples 1 through 6, the commercially available adhesive materials were utilized in accordance with the manufacturer's directions. The titanium alloy surface ply was 0.005 inch thick Ti-15V-3Al-3Cr-3Sn per AMS 4914, anodized with chromic acid on the surface to be adhesively bonded. The aluminum substructure or backing was made of 6061 T6 alloy configured as shown in FIGS. 4 through 6. The aluminum substructure had an overall length of three inches, a leading edge radius of 0.50 inch, a wall thickness of 0.25 inch, and an overall height of 1.25 inches. The nitrile phenolic film adhesive (3M Company AF32, 10 mils. thickness) was used with its complementary nitrile phenolic primer in accordance with the manufacturer's directions. No primer was applied to the composite substructure prior to application of the nitrile phenolic film adhesive.

Manufacture of sample 6 included two major steps. In the first step, the titanium alloy skin was bonded to the outer ply of nitrile phenolic film adhesive, active force generation zone and inner ply of nitrile phenolic film adhesive by partially curing in a hot air autoclave about 1 hour at about 350° F. and about 3 atmospheres pressure. In the second step, a graphite epoxy prepreg composite substructure was bonded to the structure formed in step 1 by laminating layers of the graphite epoxy prepreg to the inner layer of nitrile phenolic adhesive and placing the assembly in a hot air autoclave for 1 hour at 350° F. and about 3 atmospheres pressure. Rain erosion testing of the resulting Sample 6 for seven hours resulted in observation of slight erosion at both side edges of the sample, with no damage or erosion being observed elsewhere.

For example 6, the rain erosion test specimen was prepared to have the same overall dimensions and leading edge radius as the specimens of examples 1 through 5. The fiber-reinforced composite substructure had a nominal thickness of 0.100 inch. A plurality of countersunk holes were provided along each trailing edge of the specimen. The specimen was secured to an adapter affixed to the rotatable blade of the rain erosion test apparatus by a plurality of countersunk machine screws. The adapter was affixed to the blade in the manner used in regard to specimens of examples 1 through 5.

RAIN EROSION TEST PROCEDURE ONE

Rain erosion testing of samples 1 through 6 was conducted in the following manner. Test specimens were mechanically affixed to a rotatable arm of the test apparatus. The apparatus was adjusted to provide a sample speed of 500 mph which corresponded to an arm rpm of 1400. Water flow rate was set at 0.8 gallons per minute resulting in a rainfall rate of 1 inch per hour with a water droplet diameter of from about 1.5 to 2.0 milimeters. Each of samples 1-6 was tested utilizing the same apparatus and above stated conditions.

To confirm the excellent rain erosion resistance exhibited by Sample 6, additional samples were prepared having the following constructions.

Sample 7

| | |
|---|---|
| ——————— | (.005 Thick Ti alloy) Surface |
| ++++++++++++++++++++ | (Nitrile Phenolic Primer) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| •••••••••••••••••••• | |
| •••••••••••••••••••• | (Graphite Epoxy Composite Substructure) |
| •••••••••••••••••••• | |
| Rain Erosion Results- | 4 Hours 30 Minutes without failure. |

Sample 8

| | |
|---|---|
| ——————— | (.005 Thick Nitrited Ti alloy) Surface |
| ++++++++++++++++++++ | (Nitrile Phenolic Primer) |
| xxxxxxxxxxxxxxxxxxxx | (Nitrile Phenolic Film Adhesive) |
| ########## | (Inflatable Tube Force Generator) |
| xxxxxxxxxxxxxxxxxxxx | (Nitrile Phenolic Film Adhesive) |
| •••••••••••••••••••• | |
| •••••••••••••••••••• | (Graphite Epoxy Composite Substructure) |
| •••••••••••••••••••• | |
| Rain Erosion Results- | 4 Hours 30 Minutes without failure. |

RAIN EROSION TEST PROCEDURE TWO

Samples 7 and 8 having the shape depicted in FIG. 7 were subjected to rain erosion testing at a major airframe manufacturer. Dimensions of the samples were as follows: overall length of at least four inches, a leading edge radius 71 of 0.50 inch and an arc of 170 degrees, upper and lower leading flat areas 72, 73 extending 1.40 inches rearward from the leading edge arc at a 20 degree angle relative to the chord 78 of the specimen, and trailing upper and lower flat areas 74, 75 extending about 1.4 inches rearward from the respective forward flat areas 72, 74 parallel to the chord 78 of the specimen. The junctions 76, 77 of the respective associated leading and trailing flat areas had a radius of 0.06 to 0.25 inch. Test conditions included a speed of 600 mph at the midpoint of specimen and a water spray delivery rate of three to four inches per hour with a water droplet size of 1.5 to 2.0 millimeters. Minimum performance specifications of the aircraft manufacturer include a requirement that after 4 and ½ hours of rain erosion testing under the above stated conditions, the surface finish remain smoother in feel to a human hand than 240 grit sandpaper. Samples 7 and 8 exceeded the performance of conventional aluminum alloy aircraft outer skins on this test.

MANUFACTURE

Unless otherwise indicated at the point of use, all pressures are understood to be gauge pressure.

The structural member having integral surface separation capability according to the present invention may be manufactured as follows. A building form corresponding to the contour of the airfoil to be fitted with the leading edge apparatus is prepared. Most preferably, this is a female form which enables the leading edge apparatus to be built beginning with its outside high modulus skin layer and progressing inwardly to its base layer which will be joined to the airfoil. The manner of joinder of the completed apparatus to the airfoil is typically by use of mechanical fasteners such as recessed or flush head screws or rivets.

Manufacture of an embodiment similar to that shown in FIGS. 1, 2 and 3 and having the construction details of Sample 7 is as follows. A sheet of titanium alloy is anodized on one side which is thereafter primed by spraying with a fine mist of nitrile phenolic primer, 3M Company product code EC3901 per manufacturer's directions. The primed titanium alloy layer is thereafter baked according to the adhesive manufacturer's recommendations, in this example, 30 minutes at about 180° F.

Inflatable tubular members of the desired dimensions for the intended application are assembled from polymer coated fabric. For the preferred embodiment described in Example 7, tightly woven square weave pattern of nylon fabric having a thickness of about 0.007 inch and coated on one side to an overall thickness of about 0.015 inch with 3M Company AF32 nitrile phenolic was utilized. The coated fabric is cut on a bias into strips of the required length and width for each tube such that the cords run at a bias angle of about 45 degrees relative to the length of the strip. A typical flattened tube has a width of from about one to about two and one half inches, the smaller tube width being employed where the tube is to extend along a small radius region such as straddling a leading edge. A layer of PTFE tape or other suitable non-adhering material of a width corresponding to the width of the tube to be formed is positioned over its respective strip of tube fabric. Each tube is formed by wrapping a strip of such coated fabric in its lengthwise direction around a layer of non-adhering material so as to form a lengthwise extending overlapped area. Preferably, an additional layer of PTFE hereinafter referred to as a billet, of like width and length dimension and greater thickness than the tape is superposed on the tape. This billet facilitates forming the coated fabric into a tube. Preferably, the coated side of the fabric is positioned to form the interior of the tube. The PTFE film prevents curing together of the adjacent layers of nitrile phenolic coated fabric during subsequent manufacturing steps. This PTFE tape or other suitable release film or treatment can be allowed to remain in the completed structure. When a release tape is employed and is not to be later removed, it should be adherent on one side to the tube. The individual tubes are placed into the female mold form in the position they respectively will be located in the resulting structural member, and cured in an autoclave. The PTFE billet is removed after this tube formation step.

After this curing of the individual tubes, an aperture is formed in each tube and a fitting installed. Additional film adhesive and fabric reinforcement is used to bond the fittings to their respective tubes. In certain preferred embodiments an inlet fitting and an outlet fitting are installed near opposite ends of the tube. The internal passage of the inlet fitting is round at its end nearest the impulse delivery valve and defines an elongated slot with rounded ends where it joins the inflatable tubular member. The outlet fitting has a round internal passage. After installation of the fittings, the ends of the tubes are closed, e.g., by being folded over with additional film adhesive. The combined tubes and fittings are overlaid with a backing layer of the same coated fabric from which the tubes are formed. This subassembly is placed into the female mold form in the position it will occupy in the resulting structural member, vacuum bagged and further cured in an autoclave to bond these parts together. Use of the female mold form assures that the subassembly assumes a curvature matching that of the form. The subassembly is removed from the mold after curing.

The female mold is provided with a layer of mold release and/or release fabric or otherwise treated to assist in release of the heat cured subassembly from the female mold.

The titanium alloy outer skin is fitted into the female mold form. An outer bonding layer of nitrile phenolic film adhesive 3M code AF32 is applied to the primed and baked surface and rolled down manually while heating with a hot air gun. The outer bonding layer of film adhesive is preferably and most easily applied on a flat surface such as a work table prior to insertion of both into the mold. A layer of reinforcing fabric may be applied to the inner surface of the outer skin after application of the film adhesive. The film adhesive may be fiber reinforced.

The previously cured subassembly of combined tubes, fittings and fabric backing is applied to the outer bonding layer in the mold. At this point the combined outer skin, outer bonding layer and subassembly are adhesively joined by curing in a hot air autoclave for 1 hour at 350° F. and 3 atmospheres pressure.

After such joinder of the outer skin and subassembly, the layers forming the composite substructure are applied to the part being manufactured while the assembly remains in the female mold. In a preferred manner of substructure manufacture a plurality of layers of epoxy resin prepreg reinforcing fabric (for example, Ciba Geigy code R6376/CGG108, a graphite fiber epoxy prepreg) are successively applied until completion of the desired substructure. After completion of substructure prepreg layup, the assembly is again placed in the autoclave for completion of cure. For the nitrile phenolic and epoxy systems employed in the construction of Sample 7, this final cure was 1 hour at 350° F. and 3 atmospheres pressure dry air. Each of the previously described cure steps were performed using similar conditions. Thereafter the part and mold are removed from the autoclave and the part removed from the mold.

To facilitate flush mounting by mechanical fasteners, the titanium skin is dimpled and bored through at locations appropriate to the intended airfoil application prior to lay-up of the composite part. Following completion of all mold curing steps, the part is bored through at these dimpled locations.

The completed part is thereafter installed for use with rivets or screws such as those depicted in FIG. 1 to its intended structural member. The inlet ports in each of the tubes for introduction of gas pressure impulses into the inflatable members provided during construction of the part are coupled to a conduit which in turn is in fluid communication with fluid impulse generation apparatus.

Alternatively, when the radius of curvature is sufficiently large such that buckling or puckering of the tubes does not occur upon attempt to enter the following described flat preform into the mold, for convenience, the uncured tubes and fittings may be applied to the combined outer skin and outer film adhesive layer on a flat work surface to form a preform. If the radius of the female mold is sufficiently small, buckling or puckering may occur upon attempt to enter the flat preform into the mold. Where such buckling or wrinkling of the tubes or backing fabric is observed, the tubes are preferably applied after insertion of the preform into the female mold.

While the invention has been described in detail to include pneumatic impulse force and displacement generation means, it is believed possible to substitute any other thin planar force and displacement generation means into the active zone which lies between the spaced layers of film adhesive. Examples of suitable thin, sheet-like electromagnetic force and displacement generation means are described in U.S. Pat. No. 4,690,353 to Haslim et. al. and U.S. Pat. No. 4,875,644 to Lowell J. Adams, et. al. The electromagnetic force and displacement generation means of Adams et. al. includes a pair of sheet-like arrays, each containing in spaced apart relationship a plurality of parallel ribbon-shaped electrically conductive members. The electrically conductive members are electrically interconnected such that any current flowing in the conductive members flows in the electrically conductive members of the second sheet-like array in a direction opposite. Preferably, the electrically conductive members are interconnected such that any electrical current flowing in the conductive members flows in the same direction in adjacent electrically conductive members in the first sheet-like member and also flows in adjacent electrically conductive members of the second sheet-like array in an opposite direction. The first and second sheet-like arrays are coextensive and superposed proximate to each other such that the electrically conductive members of the first and second sheet-like members are substantially parallel. The electrically conductive members are electrically insulated from one another. Large magnitude current pulses are fed to the conductors from a power supply resulting in rapid and forceful separation of the first and second sheet-like arrays, thereby causing rapid movement of the outer high modulus layer on which ice may accrete.

Although the invention has been described with reference to certain and preferred embodiments, including the best embodiments, it would be apparent to people skilled in the art of deicing of aircraft that other variations are possible which are obvious thereover. These variations are intended to be included by the present specification and appended claims. Different adhesive materials may be employed. The inflatable tubes may be bonded directly to the outer skin and the substructure without use of separately applied adhesive film bonding layers. The outer metallic skin may be treated to further enhance its hardness or to provide a reduced coefficient of ice adhesion. The outer metallic skin may be provided with a backing layer of fiber reinforced resin to enhance resistance to impact, e.g., hail or bird strikes. A combination of gas pressure impulse and electrically energized force and displacement generating means may be employed in a single part. The composite substructure need not be of uniform thickness or construction throughout the entire contour surface but rather may be locally made of differing dimensions and properties according to the requirements of the intended application. Specifically, the composite substructure may be reinforced adjacent to its point of mechanical joinder to remainder of the airfoil structure. The inflatable tubular members may be arranged to extend in a spanwise direction of airfoil as depicted in FIG. 1 or in the chordwise direction (not illustrated) or in a combination of directions to provide enhanced performance. The best manner of tube arrangement for a particular application is empirically determinable by one skilled in the art.

What is claimed is:

1. A method of making a unitary structural member having integral surface de-icing capability, the method comprising the steps of:
   (a) providing a female mold,
   (b) inserting an outer thin high tensile modulus skin having an inner side and an obverse outer side and an outer bonding layer into the mold with the outer side of the skin nearest the mold,
   (c) forming thin force and displacement generation means having an inner side and an obverse outer side and applying the outer side of the thin force and displacement generation means to the outer bonding layer,
   (d) forming a composite substructure of a plurality of layers of reinforcing filaments in a polymeric matrix and applying said substructure to the inner side of the force and displacement generation means, and
   (e) bonding the combined outer skin, force and displacement generation means, and substructure together to provide said unitary structural member.

2. The method of claim 1, further comprising the step of curing the force and displacement generation means in the mold in the position the force and displacement generation means will occupy in the completed structural member prior to bonding said force and displacement generation means to said outer skin.

3. The method of claim 1 further comprising the step of providing the inner side of the outer thin high tensile modulus skin with a fiber reinforced resin backing layer.

4. The method of claim 1 wherein the outer skin is of metal.

5. The method of claim 1 wherein the outer skin is of plastic.

6. The method of claim 1 wherein the step of bonding the combined outer skin, force and displacement generation means, and substructure includes the step of curing at elevated temperature and pressure to provide said unitary structural member.

7. The method of claim 1 further comprising the step of applying an inner bonding layer to the force and displacement generation means before application of the substructure.

8. The method of claim 1 further comprising the step of dimpling the high tensile modulus skin at predetermined locations prior to inserting the skin into the mold.

9. The method of claim 8 further comprising the step of boring through the unitary structural member at said predetermined dimpled locations.

10. The method of claim 1, further comprising the steps of forming force and displacement generation means including at least one inflatable tubular member of polymer coated fabric and curing said inflatable tubular member in the configuration it will assume in the completed structural member prior to incorporating it into said structural member.

11. The method of claim 10, further comprising the step of forming said at least one inflatable tubular member by wrapping a strip of bias cut polymer coated fabric around a lengthwise extending layer of non-adhering material to form a lengthwise extending overlapped area.

12. The method of claim 11, wherein two substantially congruent layers of non-adhering material are superposed prior to wrapping the fabric around them to form a tubular member, one of which is removed subsequent to curing of the tubular member.

13. The method of claim 11 further comprising the steps of installing a fitting into each cured tubular member and overlaying the combined fitting and tubular member with a layer of polymer coated fabric to form a subassembly, and curing the subassembly to a curvature matching that it will occupy in the completed structural member prior to incorporating said subassembly into said structural member.

14. The method of claim 13 wherein each fitting has two opposing ends and an internal passage, said internal passage being round at one fitting end and defining an elongated slot with rounded ends at the other fitting end, and wherein the step of installing a fitting into each cured tubular member includes the step of installing the elongated slot end of each fitting into each cured tubular member.

15. A method of making a unitary structural member having integral surface de-icing capability, the method comprising:

(a) Providing a female mold, and
(b) Preparing a titanium alloy sheet by, (1) dimpling the sheet at predetermined locations, (2) anodizing one side of the sheet, and (3) applying a layer of nitrile phenolic film adhesive to the anodized side of the sheet, and
(c) Coating a tightly woven nylon cord fabric on one side with nitrile phenolic polymer, and
(d) Forming a flattened cured tube from the coated fabric by, (1) cutting a strip from the coated fabric on a bias such that the cords run at a bias angle of about 45 degrees relative to the length of the strip, (2) applying a layer of non-adhering material to the coated side of the fabric strip such that the width of the no-adhering layer corresponds to the finished width of the flattened tube, (3) superposing a billet of non-adhering material over the first layer of non-adhering material, (4) wrapping the strip of coated fabric in the lengthwise direction around the billet so as to form a lengthwise extending overlapped area, and (5) curing the wrapped strip of coated fabric under heat and pressure while encased on the billet, and
(e) Forming a cured subassembly consisting of a fabric backing and a plurality of tubes and fitting by, (1) forming apertures in a cured tube and installing at least one inlet fitting and at least one outlet fitting using additional film adhesive and fabric reinforcement to bond the fittings to the tube,(2) removing the billet, (3) folding each end of the tube over onto itself using a layer of film adhesive to form a closure of the tube end, (4) applying a layer of coated fabric over a plurality of tubes and fittings, (5) placing the subassembly into the female mold in the position it will occupy in the resulting structural member, (6) curing the subassembly with heat and pressure, and (7) removing the cured subassembly from the female mold, and
(f) Placing the prepared titanium alloy sheet and the cured subassembly into the female mold such that the film adhesive is sandwiched in between the cured subassembly and the titanium alloy sheet, and applying heat and pressure to cure the film adhesive and bond the subassembly to the titanium alloy sheet, and,
(g) Applying a plurality of resin prepreg reinforcing fabric plies to the cured subassembly opposite the skin to form a substructure which is subsequently cured under heat and pressure to form a unitary structure, and
(h) Removing the unitary structure from the female mole and boring through the unitary structure at the dimpled locations.

* * * * *